(12) United States Patent
Bud et al.

(10) Patent No.: US 12,554,491 B2
(45) Date of Patent: Feb. 17, 2026

(54) VECTOR PROCESSOR TILE ARRAY WITH INPUT AND OUTPUT STREAMS

(71) Applicant: Microsoft Technology Licensing, LLC, Redmond, WA (US)

(72) Inventors: Joel Ephraim Bud, Tel Aviv (IL); Segev Ravgad, Ramat HaSharon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/662,955

(22) Filed: May 13, 2024

(65) Prior Publication Data

US 2025/0348311 A1 Nov. 13, 2025

(51) Int. Cl.
*G06F 9/30* (2018.01)
*G06F 9/38* (2018.01)

(52) U.S. Cl.
CPC ...... *G06F 9/30036* (2013.01); *G06F 9/30065* (2013.01); *G06F 9/3887* (2013.01)

(58) Field of Classification Search
None
See application file for complete search history.

(56) References Cited

U.S. PATENT DOCUMENTS

| | | | |
|---|---|---|---|
| 11,868,250 B1 * | 1/2024 | Ross | G06F 13/1689 |
| 2021/0182077 A1 * | 6/2021 | Chen | G06F 40/263 |
| 2023/0069536 A1 * | 3/2023 | Morrison | G06N 3/08 |
| 2023/0153116 A1 * | 5/2023 | Nagarajan | G06N 3/02 |
| | | | 712/7 |
| 2023/0251970 A1 * | 8/2023 | Bhardwaj | G06F 12/0888 |
| 2023/0269076 A1 * | 8/2023 | Brandt | H04L 9/32 |
| | | | 713/189 |
| 2023/0386238 A1 * | 11/2023 | Zhu | G06N 3/04 |

OTHER PUBLICATIONS

Extended European search report received for EP Application No. 25174846.3, mailed on Oct. 14, 2025, 10 Pages.
Zicari, et al., "A matrix product accelerator for field programmable systems on chip", In Journal of Microprocessors and Microsystems, vol. 32, Issue 02, Mar. 2008, pp. 53-67.

\* cited by examiner

*Primary Examiner* — Eric Coleman
(74) *Attorney, Agent, or Firm* — Alleman Hall LLP

(57) ABSTRACT

A computing system including a hardware accelerator configured to receive vector processing instructions from a processor. The vector processing instructions include an initial read address, an input increment size, and a vector processing operation. During vector processing iterations performed at vector processor tiles included in a vector processor tile array, the hardware accelerator reads vector elements into respective vector processor tiles in an input stream. The vector elements are read into the vector processor tiles from locations in memory that start at the initial read address and advance by the input increment size at successive vector processing iterations. At each of the vector processor tiles, the hardware accelerator computes a vector processing result at least in part by performing the vector processing operation on the vector element read into the vector processor tile. The hardware accelerator outputs the vector processing results from the vector processor tiles in an output stream.

20 Claims, 12 Drawing Sheets

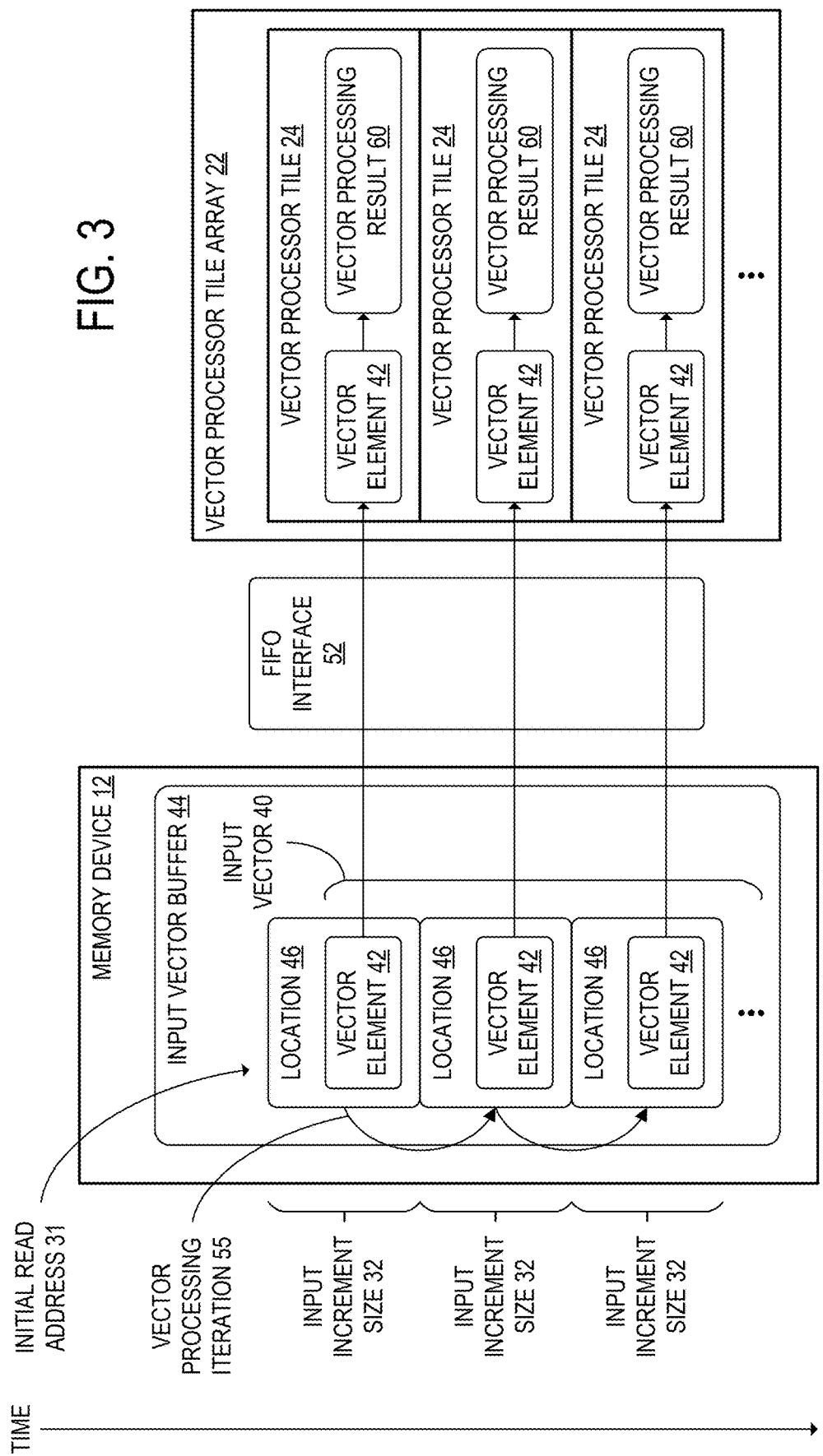

VECTOR PROCESSOR TILE ARRAY WITH INPUT AND OUTPUT STREAMS

BACKGROUND

Recent advances in machine learning have been facilitated using larger neural networks and increased amounts of training data. Additionally, the use of machine learning models for real-time processing has become more common. To support these developments, specialized hardware, such as hardware accelerators, have been created to efficiently perform computations commonly used in machine learning. These hardware accelerators are designed to perform machine learning computations more efficiently than general-purpose processors like CPUs and even more specialized processors like GPUs.

SUMMARY

A computing system is described herein that includes a hardware accelerator for performing generalized matrix multiplication (GEMM) operations. The hardware accelerator receives vector processing instructions from a processor, which include an initial read address, an input increment size, and a vector processing operation. The hardware accelerator is configured to read a plurality of vector elements into respective vector processor tiles of a vector processor tile array in an input stream. The vector elements are read into the vector processor tiles from locations in memory that start at the initial read address and advance by the input increment size at successive vector processing iterations. Each tile of the hardware accelerator computes a respective vector processing result by performing the vector processing operation on the vector element read into the vector processor tile. The hardware accelerator is further configured to output the vector processing results from the vector processor tiles in an output stream.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 schematically shows an input stream that is input into the vector processor tile array, according to the example of FIG. 2.

DETAILED DESCRIPTION

In machine learning model training and inferencing, operations are frequently performed on vector-typed data. Vector processors have therefore been developed as hardware accelerators for such operations. At a vector processor, computing processes with vector-valued inputs are performed in a manner that is more efficient (e.g., in terms of processing time) than performing those computing processes at a general-purpose processor such as a CPU.

Memory management frequently leads to time inefficiency for existing vector processors. At conventional vector processors, memory management is typically CPU-driven. The vector processor communicates read and write locations to and from the CPU multiple times over the course of processing a vector, thereby resulting in latency overhead. Having to frequently communicate with the CPU may also limit the parallelizability of vector operations performed at the vector processor. In addition, the inputs and outputs of existing vector processors are typically loaded into respective input and output buffers within the vector processor before and after performing the vector operation. Loading and retrieving data from these buffers typically results in additional latency.

Figure 1:
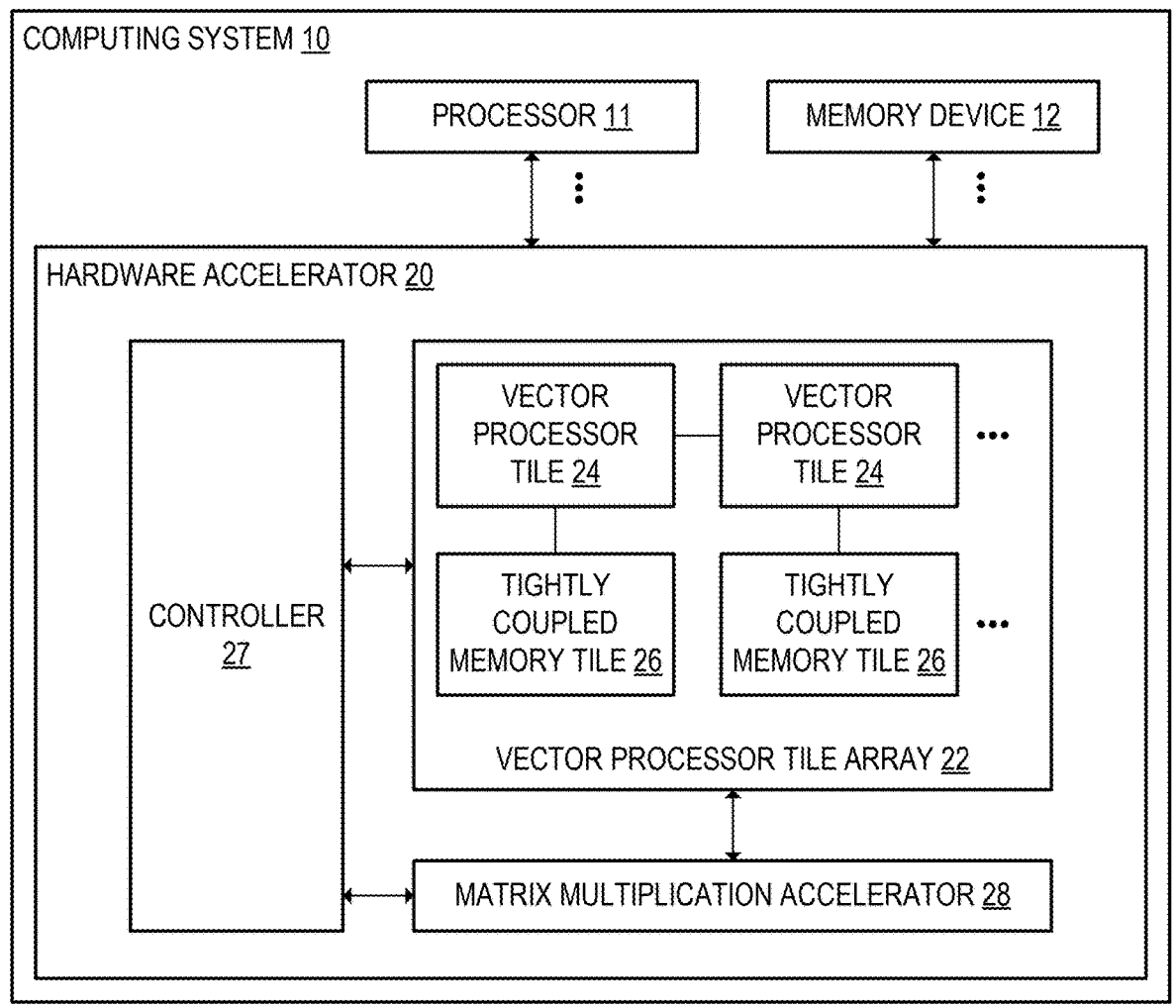
FIG. 1 schematically shows a computing system including one or more processors, one or more memory devices, and a hardware accelerator that includes a vector processor tile array, according to one example embodiment.

In order to address the above challenges, a computing system 10 is provided, according to the example of FIG. 1. The computing system 10 shown in the example of FIG. 1 includes one or more processors 11, one or more memory devices 12, and a hardware accelerator 20. The one or more processors 11 may include, for example, one or more CPUs, one or more GPUs, and/or one or more other hardware accelerators. The one or more memory devices 12 may include one or more volatile memory devices and/or one or more non-volatile storage devices. In the example of FIG. 1, the hardware accelerator 20 is a neural processing unit (NPU).

In some examples, the components of the computing system 10 shown in FIG. 1 may have a system-on-a-chip (SoC) configuration in which the hardware accelerator 20, one or more processors 11, and one or more memory devices 12 are provided in an integrated computing device component. In other examples, the components of the computing system 10 shown in FIG. 1 may be provided as separate components of a physical computing device. Components of the computing system 10 may also be distributed across a plurality of interlinked physical computing devices in some examples.

The hardware accelerator 20 depicted in FIG. 1 includes a vector processor tile array 22 that includes a plurality of vector processor tiles 24. The vector processor tiles 24 are configured to perform steps of a vector processing operation in parallel, as discussed in further detail below. The vector processor tile array 22 further includes a plurality of tightly coupled memory tiles 26 respectively associated with the vector processor tiles 24. The vector processor tiles 24 are configured to use the tightly coupled memory tiles 26 as working memory when performing the vector processing operations and are configured to communicate with the tightly coupled memory tiles 26 via direct memory access (DMA).

In the example of FIG. 1, the hardware accelerator 20 further includes a controller 27 that is configured to manage control instructions for the hardware accelerator 20. The hardware accelerator 20 further includes a matrix multiplication accelerator 28 that is specialized for performing matrix multiplication operations more efficiently than a general-purpose processor. Control instructions for the matrix multiplication accelerator 28 are also managed by the controller 27 in the example of FIG. 1.

Figure 2:
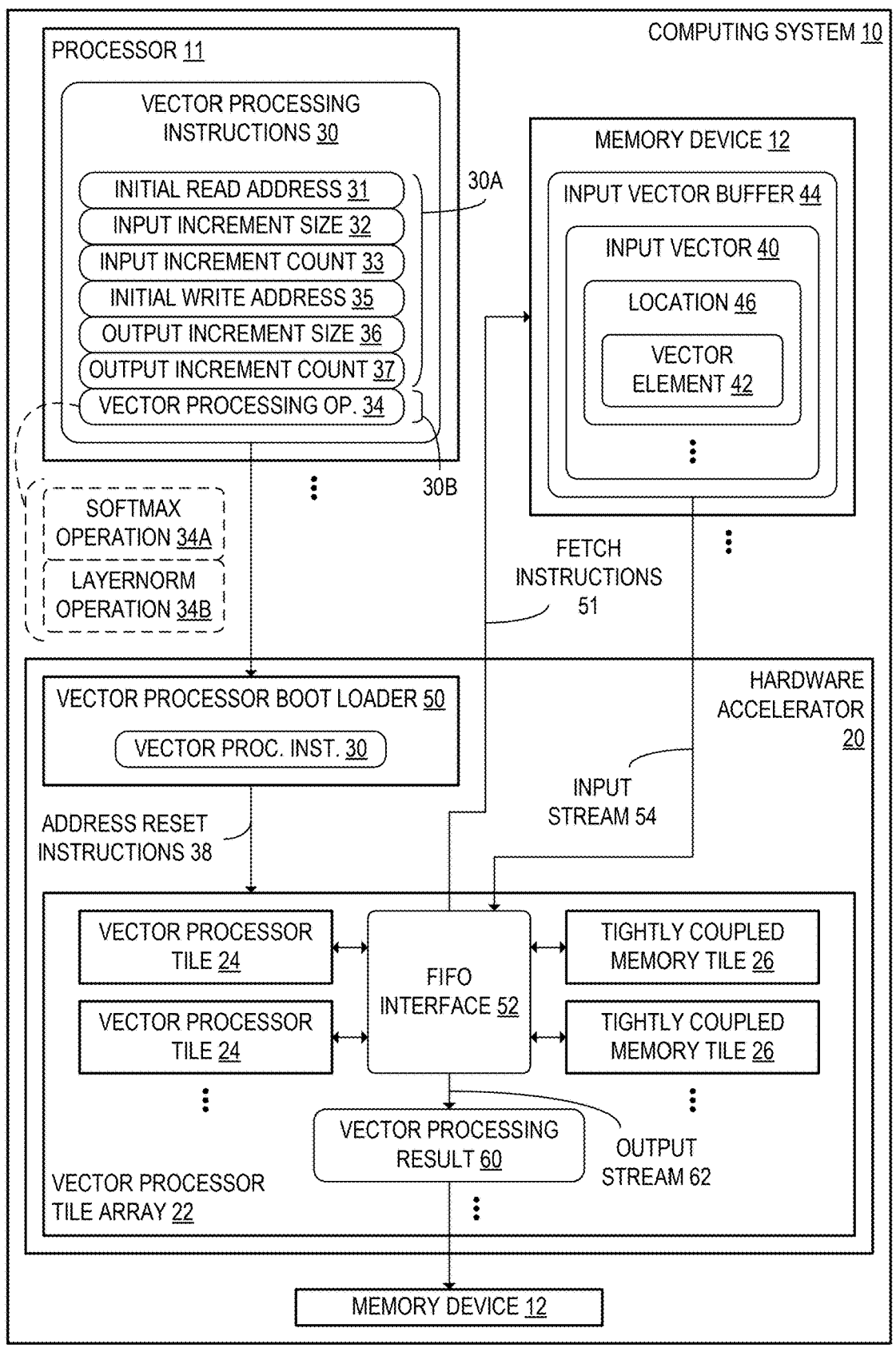
FIG. 2 schematically shows the computing system when an input vector is processed at the hardware accelerator, according to the example of FIG. 1.

FIG. 2 schematically shows the computing system 10 when an input vector 40 is processed at the hardware accelerator 20. According to the example of FIG. 2, a processor 11 of the one or more processors 11 is configured to compute vector processing instructions 30 including an initial read address 31 from which the hardware accelerator 20 is configured to retrieve an input vector 40. The vector processing instructions 30 further include an input increment size 32 and an input increment count 33. The input increment size 32 may, for example, be specified as a number of bits. In some examples, the input increment size 32 and/or the input increment count 33 may be a fixed property of the vector processor tile array 22 instead of a parameter specified in the vector processing instructions 30.

In the example of FIG. 2, the vector processing instructions 30 further include an initial write address 35 to which the hardware accelerator 20 is configured to write a vector processing result 60. In addition, the vector processing instructions 30 shown in the example of FIG. 2 include an output increment size 36 and an output increment count 37. In some examples, the output increment size 36 and/or the output increment count 37 may be a fixed property of the vector processor tile array 22 instead of a parameter specified in the vector processing instructions 30.

The vector processing instructions 30 further specify a vector processing operation 34 that the hardware accelerator 20 is instructed to perform. For example, the vector processing operation 34 may be a SoftMax operation 34A or a layernorm operation 34B. Other vector processing operations 34 may be specified in other examples.

In some examples, the vector processing instructions 30 are structured as a set of operation arguments 30A and an operation code segment 30B. The operation arguments 30A may include the initial read address 31, the input increment size 32, the input increment count 33, the initial write address 35, the output increment size 36, and the output increment count 37. The operation arguments 30A may, in some examples, further include one or more operation-specific parameters, such as an axis of a two-dimensional tensor along which a SoftMax operation 34A is performed. The operation code segment 30B may specify the vector processing operation 34.

Subsequently to computing the vector processing instructions 30, the processor 11 is further configured to transmit the vector processing instructions 30 to the hardware accelerator 20, and the hardware accelerator 20 is configured to receive the vector processing instructions 30. The vector processing instructions 30 may, for example, be transmitted to the hardware accelerator 20 in a block of machine code instructions that includes a plurality of vector processing instructions 30, thereby decreasing the amount of communication performed between the processor 11 and the hardware accelerator 20.

In some examples, as shown in FIG. 2, the hardware accelerator 20 includes a vector processor boot loader 50 that is configured to receive the vector processing instructions 30 and output address reset instructions 38 to the vector processor tile array 22 based at least in part on the vector processing instructions 30. The address reset instructions 38, in such examples, are configured to control the vector processor tiles 24 to reset a memory address from which their inputs are received, as discussed in further detail below. According to the example of FIG. 2, the vector processor boot loader 50 is further configured to transmit the vector processing instructions 30 to the individual vector processor tiles 24.

The vector processor tile array 22 further includes a first-in-first-out interface 52. The FIFO interface 52 is an interface over which the vector processor tiles 24 are configured to communicate with other components of the computing system 10. The FIFO interface 52 is configured to accommodate a plurality of parallel FIFO connections between components of the hardware accelerator 20 and/or other components of the computing system 10. For example, as shown in FIG. 2, the vector processor tiles 24 may each be configured to communicate with the tightly coupled memory tiles 26 over the FIFO interface 52. Using a shared FIFO interface 52 instead of loading inputs and outputs of the vector processor tiles 24 into separate buffers may reduce latency associated with memory storage and retrieval of inputs and outputs.

Inputs to the vector processing operation 34 are stored at one or more memory devices 12. In the example of FIG. 2, the one or more memory devices 12 store an input vector 40 at an input vector buffer 44. The input vector 40 includes a plurality of vector elements 42 stored at respective locations 46 in the memory device 12.

The hardware accelerator 20 is further configured to read the plurality of vector elements 42 into respective vector processor tiles 24 of the vector processor tile array 22 in an input stream 54. The vector processor tile array 22 may be configured to receive the input stream 54 over the FIFO interface 52. FIG. 3 schematically shows the input stream 54 in additional detail. The input stream 54 is received during a plurality of vector processing iterations 55 performed at the vector processor tile array 22.

When reading the vector elements 42 into the vector processor tiles 24, the vector processor tile array 22 may be configured to transmit fetch instructions 51 to the one or more memory devices 12, as shown in the example of FIG. 2. Respective fetch instructions 51 may be transmitted from the hardware accelerator 20 to the one or more memory devices 12 at each of a plurality of vector processing iterations 55 over which the vector processing operation 34 is performed. The fetch instructions 51 may be transmitted over the FIFO interface 52 and may specify the locations 46 of the vector elements 42 configured to be processed at those vector processing iterations 55. By transmitting the fetch instructions 51 directly from the hardware accelerator 20 to the one or more memory devices 12, the hardware accelerator 20 may bypass having to coordinate memory access at the processor 11. The vector processing operation 34 performed at the hardware accelerator 20 may accordingly have reduced latency compared to vector operations performed at conventional hardware accelerators.

Over the plurality of vector processing iterations 55, the vector elements 42 are read into the vector processor tiles 24 from respective locations 46 in the one or more memory devices 12 that start at the initial read address 31. The locations 46 in the one or more memory devices 12 from which the vector elements 42 are read into the vector processor tiles 24 may advance by the input increment size 32 at successive vector processing iterations 55. In examples in which the vector processing instructions 30 include an input increment count 33, the hardware accelerator 20 may be configured to read the vector elements 42 into the vector processor tiles 24 over a number of vector processing iterations 55 equal to the input increment count 33.

At each of the vector processor tiles 24, the vector processor tile array 22 is further configured to compute a respective vector processing result 60. The vector processing results 60 are computed at each of the vector processor tiles 24 at least in part by performing the vector processing operation 34 indicated in the vector processing instructions 30 on the vector element 42 read into the vector processor tile 24. One or more intermediate processing steps may also be performed in order to compute the vector processing results 60, as discussed in further detail below.

Returning to FIG. 2, the vector processor tile array 22 is further configured to output the vector processing results 60 from the vector processor tiles 24 in an output stream 62. The vector processor tile array 22 may be configured to output the output stream 62 over the FIFO interface 52. The vector processor tiles 24 are configured to output the vector processing results 60 to a memory device 12 of the one or more memory devices 12 in the example of FIG. 2. However, in other examples, the vector processing results may additionally or alternatively be output to a processor 11 of the one or more processors 11, or to the matrix multiplication accelerator 28 included in the hardware accelerator 20.

Figure 4A:
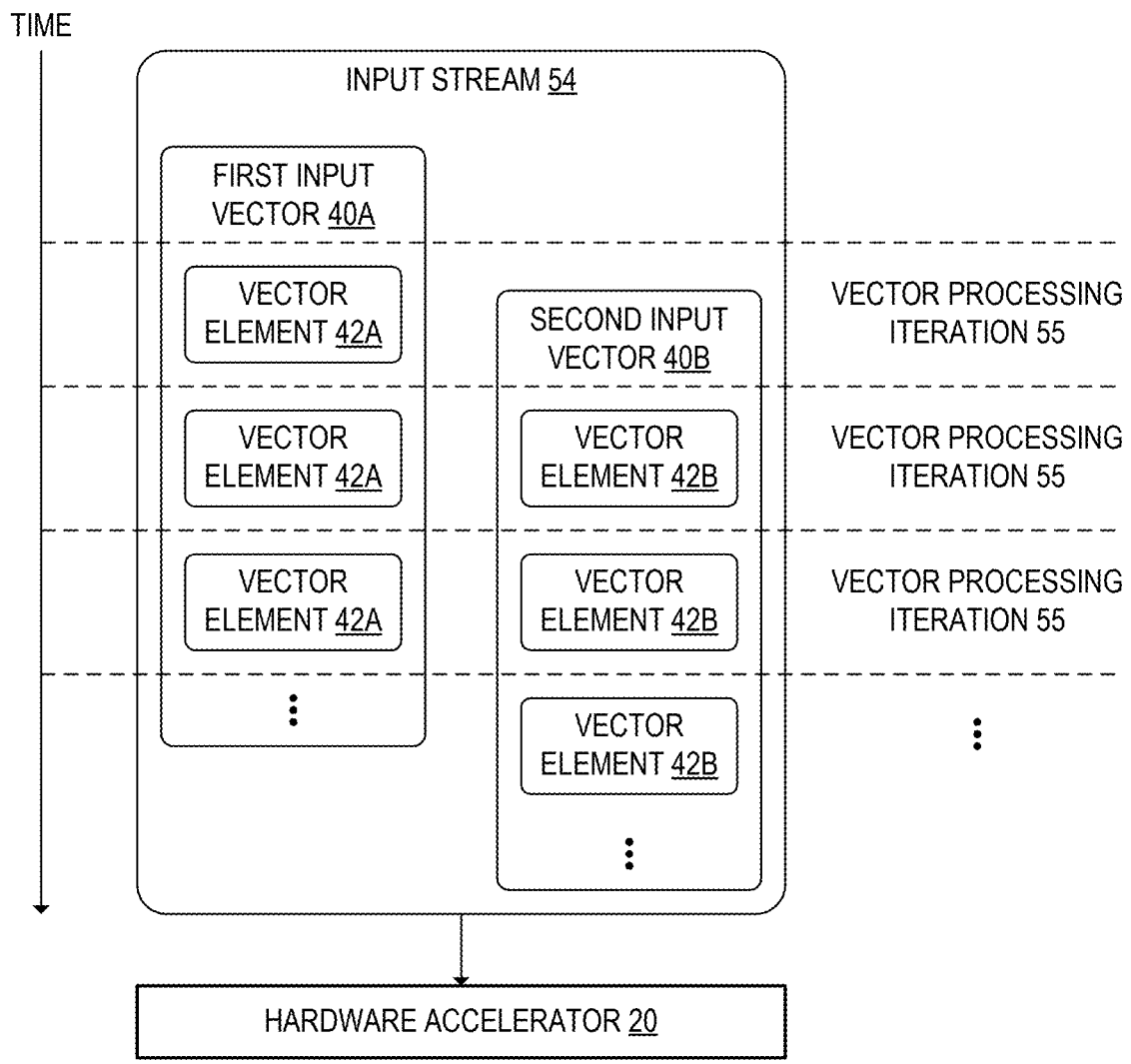
FIG. 4A schematically shows an example input stream including two input vectors that are concurrently processed at the hardware accelerator, according to the example of FIG. 2.

In some examples, as shown in FIG. 4A, the hardware accelerator 20 may be configured to concurrently process two or more input vectors 40 included in the input stream 54. FIG. 4A schematically shows an example input stream 54 including a first input vector 40A and a second input vector 40B. The second input vector 40B is offset in time from the first input vector 40A by a vector processing iteration 55. Thus, the vector processor tiles 24 included in the vector processor tile array 22 may be configured to begin processing vector elements 42B of the second input vector 40B after those vector processor tiles 24 have performed the specified vector processing operation 34 on the vector elements 42A of the first input vector 40A, but before the entire first input vector 40A has been received at the vector processor tile array 22. Concurrently processing the first input vector 40A and the second input vector 40B may accordingly decrease the idle time of the vector processor tiles 24 and increase the utilization rate of the vector processor tile array 22.

Figure 4B:
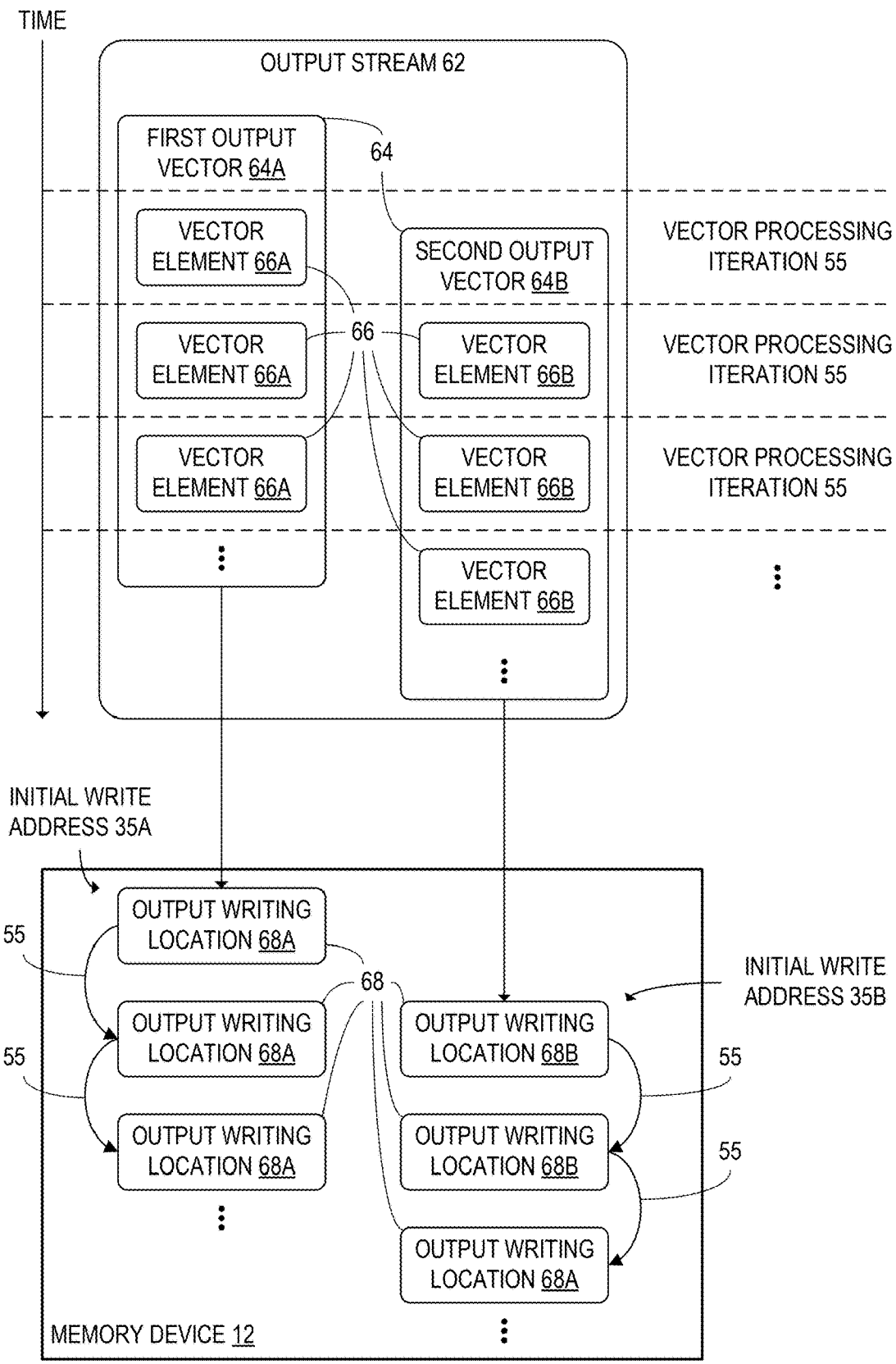
FIG. 4B schematically shows an example output stream generated from the input vectors of FIG. 4A.

FIG. 4B schematically shows an example output stream 62 in an example in which multiple input vectors 40 are concurrently processed at the vector processor tile array 22 to obtain respective output vectors 64 of vector elements 66. By concurrently processing the first input vector 40A and the second input vector 40B of FIG. 4A, the vector processor tile array 22 is configured to obtain a first output vector 64A and a second output vector 64B that respectively include a plurality of output vector elements 66A and a plurality of output vector elements 66B. The vector processor tile array 22 is configured to output the first output vector 64A concurrently with the second output vector 64B. In the example of FIG. 4B, the vector elements 66B of the second output vector 64B are offset in time from the vector elements 66A of the first output vector 64A in the output stream 62.

The vector elements 66 included in the output stream 62 may be written to respective output writing locations 68 in the one or more memory devices 12. The vector processor tile array 22 is configured to write the vector elements 66A of the first output vector 64A to respective output writing locations 68A starting at an initial write address 35A and advancing by the output increment size 36 at successive vector processing iterations 55 until the output increment count 37 has been reached. Similarly, the vector processor tile array 22 is configured to write the vector elements 66B of the second output vector 64B to respective output writing locations 68B starting an initial write address 35B, in a manner that is offset in time by a vector processing iteration 55 from the writing of the first output vector 64A to the memory device 12. In some examples, the first output vector 64A and the second output vector 64B may have the same output increment size 36 and the same output increment count 37. The output increment size 36 and the same output increment count 37 may alternatively differ between the output vectors 64.

Figure 5:
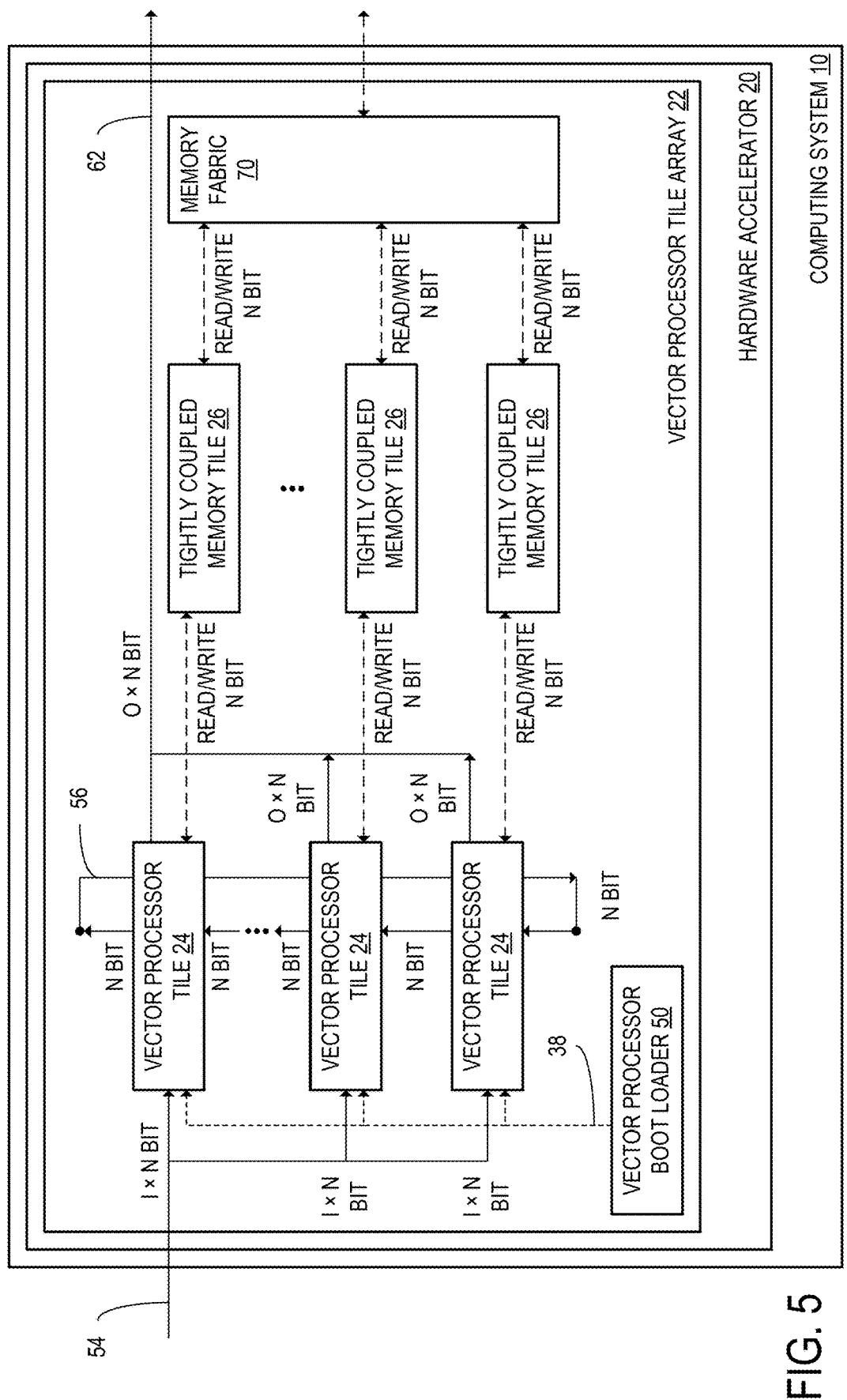
FIG. 5 schematically shows components of the vector processor tile array, according to the example of FIG. 2.

FIG. 5 schematically shows the vector processor tile array 22 in additional detail, according to one example. When the vector processor tile array 22 processes an input vector 40, inputting the input stream 54 into the vector processor tile array 22 includes transmitting a respective N-bit vector element 42 to each of the vector processor tiles 24 at each of/vector processing iterations 55. In addition, when the vector processor tiles 24 output the output stream 62, each of the vector processor tiles 24 outputs a respective N-bit vector element 66 at each of O vector processing iterations 55.

During respective vector processing iterations 55, the vector processor tiles 24 may be further configured to exchange data with the corresponding tightly coupled memory tiles 26 in N-bit increments. Communication between the vector processor tiles 24 and the tightly coupled memory tiles 26 may be performed during multi-step vector processing operations 34, as discussed in further detail below. The example vector processor tile array 22 of FIG. 5 further includes a memory fabric 70 configured to perform DMA between the tightly coupled memory tiles 26 and one or more other memory or processing components, such as those located in the matrix multiplication accelerator 28.

The vector processor tile array 22 shown in the example of FIG. 5 further includes a token transfer ring 56. Via the token transfer ring 56, the vector processor tiles 24 may be configured to transmit data to other vector processor tiles 24 in N-bit increments during multi-step vector processing operations 34.

The vector processor boot loader 50 is also shown in the example of FIG. 5. In the example of FIG. 5, the vector processor boot loader 50 is configured to transmit the address reset instructions 38 to the vector processor tiles 24 in parallel to prepare the vector processor tiles 24 to process the input vector 40.

Figure 6:
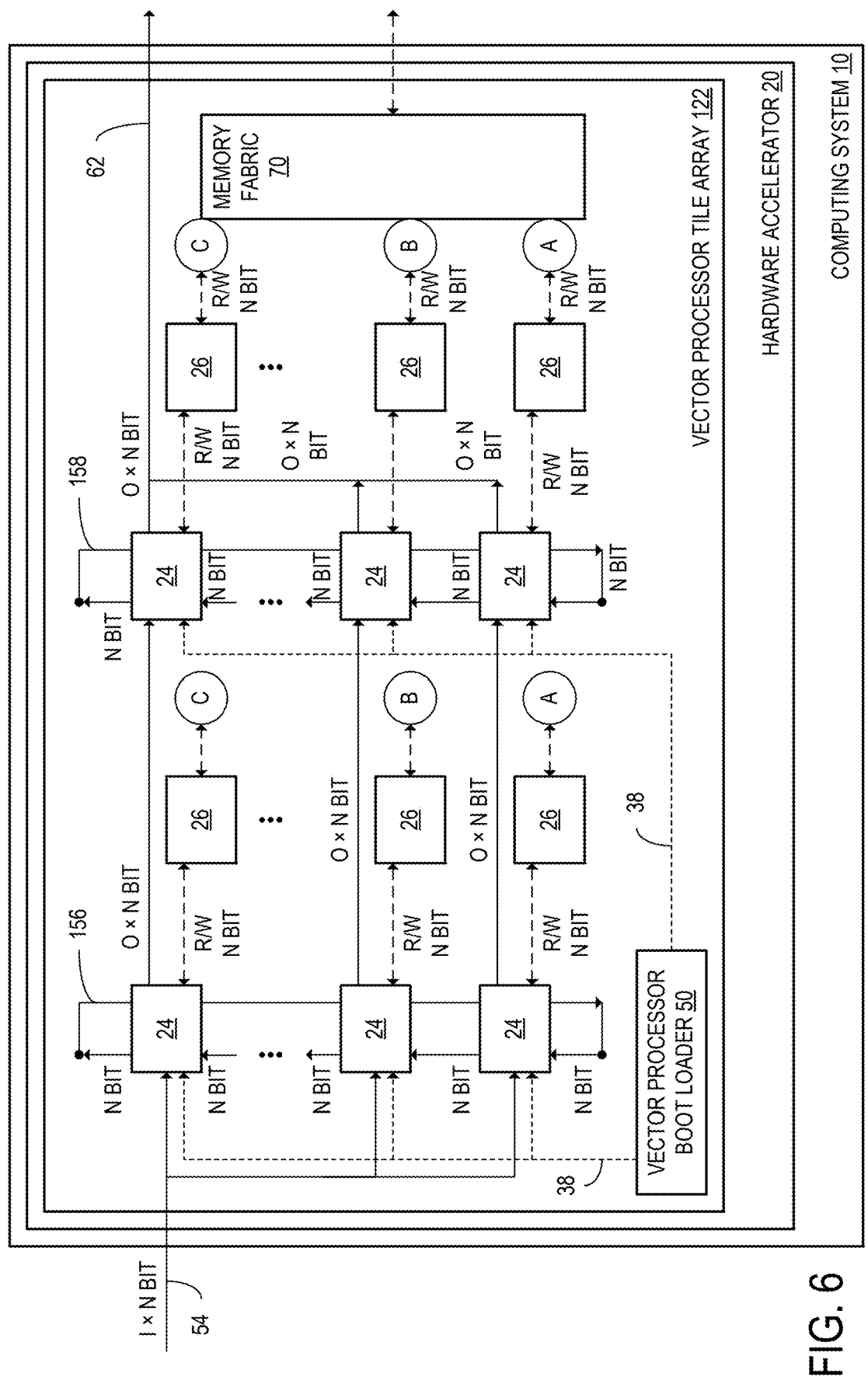
FIG. 6 schematically shows components of another example vector processor tile array, according to the example of FIG. 2.

FIG. 6 schematically shows another example vector processor tile array 122 that includes two columns of vector processor tiles 24 arranged in a first token transfer ring 156 and a second token transfer ring 158. The vector processor tile array 122 further includes respective columns of tightly coupled memory tiles 26 associated with the vector processor tiles 24. Both sets of tightly coupled memory tiles 26 are configured to communicate via DMA with their respective vector processor tiles 24 and the memory fabric 70.

By including two columns of vector processor tiles 24, the vector processor tile array 122 of FIG. 6 may be configured to process two input streams 54 concurrently. In other examples, the vector processor tile array 122 may include more than two columns of vector processor tiles 24 and may accordingly be configured to concurrently process a corresponding number of input streams 54.

Figure 7A:
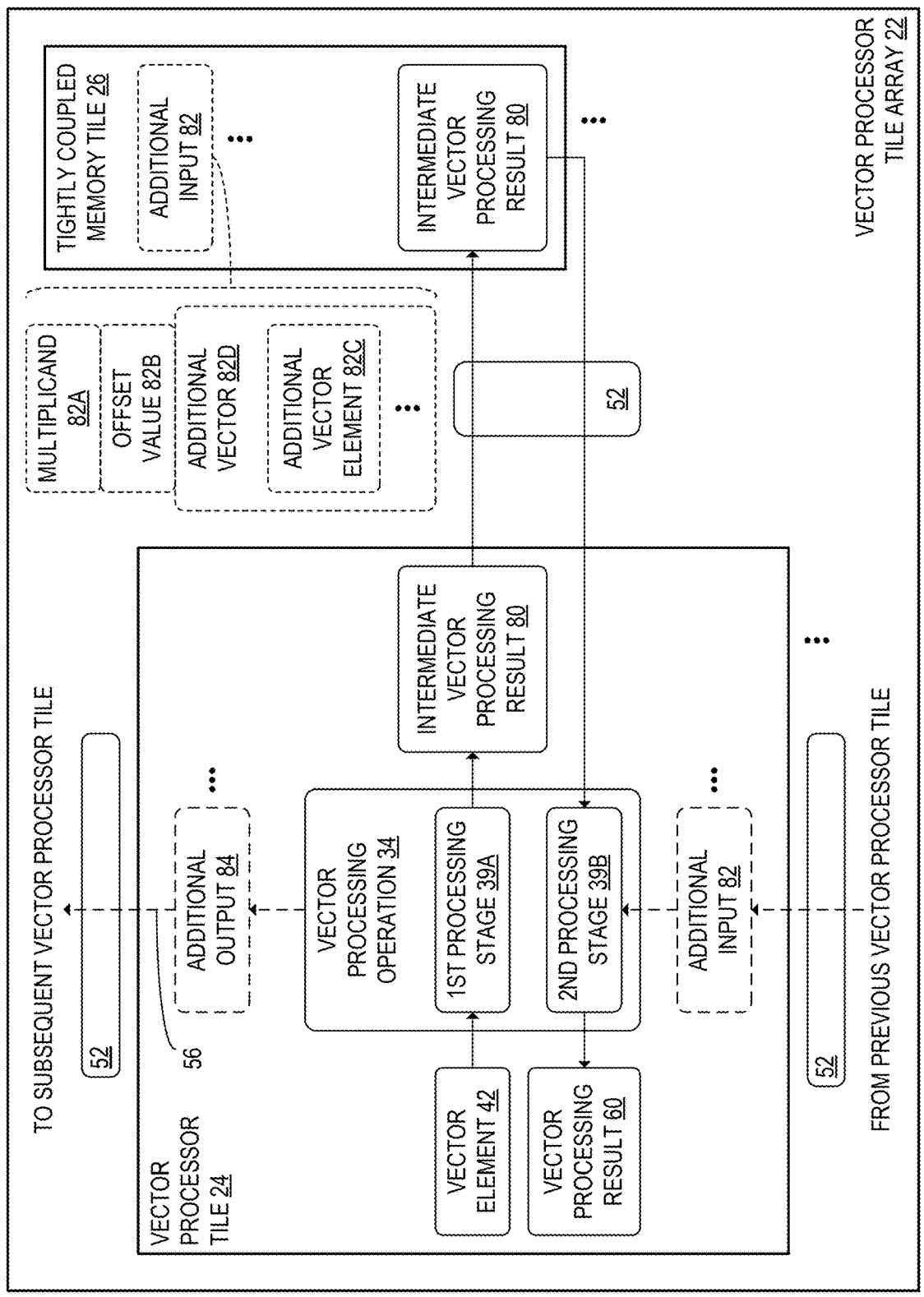
FIG. 7A schematically shows the vector processor tile array in an example in which the vector processor tiles are each further configured to compute respective intermediate vector processing results, according to the example of FIG. 2.

FIG. 7A schematically shows the vector processor tile array 22 in an example in which the vector processor tiles 24 are each further configured to compute respective intermediate vector processing results 80. FIG. 7A depicts an example vector processor tile 24 that is configured to perform a first processing stage 39A and a second processing stage 39B included in the vector processing operation 34 when computing the vector processing result 60. At the first processing stage 39A, the vector processor tile 24 is configured to compute an intermediate vector processing result 80 based at least in part on a vector element 42 received at the vector processor tile 24 in the input stream 54. The vector processor tile 24 is further configured to store the intermediate vector processing result 80 at the corresponding tightly coupled memory tile 26. The intermediate vector processing result 80 shown in FIG. 7A is transmitted between the vector processor tile 24 and the tightly coupled memory tile 26 over the FIFO interface 52.

The example vector processor tile 24 of FIG. 7A is further configured to receive the intermediate vector processing result 80 from the tightly coupled memory tile 26 and perform the second processing stage 39B on the intermediate vector processing result 80. Thus, the vector processor tile 24 is configured to compute the vector processing result 60 based at least in part on the intermediate vector processing result 80. In some examples, the second processing stage 39B may be performed at a subsequent vector processing iteration 55 relative to the first processing stage 39A.

The second processing stage 39B may additionally or alternatively utilize one or more additional inputs 82 other than the intermediate vector processing result 80. For example, the one or more additional inputs 82 may include one or more other vector elements 42. The one or more additional inputs 82 may, in some examples, be received from a previous vector processor tile 24 over the token transfer ring 56. In such examples, the vector processor tile 24 may be further configured to transmit one or more additional outputs 84 of the vector processing operation 34 to a subsequent vector processor tile 24 over the token transfer ring 56 for use as the one or more additional inputs 82 at that subsequent vector processor tile 24. The one or more additional inputs 82 and the one or more additional outputs 84 may include the intermediate vector processing results 80 in some examples.

In some examples, as shown in FIG. 7A, the tightly coupled memory tiles 26 may be configured to store the additional inputs 82 to the vector processing operation 34. The vector processor tiles 24 may be further configured to receive these additional inputs 82 from the tightly coupled memory tiles 26. At the vector processor tiles 24, the vector processor tile array 22 may be further configured to perform the vector processing operation 34 to compute the vector processing results 60 in parallel based at least in part on the additional inputs 82.

The additional inputs 82 used in such examples may, for example, include a multiplicand 82A that is used to compute elementwise products of the vector elements 42. The additional inputs 82 may additionally or alternatively include an offset value 82B that is configured to be added elementwise to each of the vector elements 42 of the input vector 40. As another example, the additional inputs 82 may include additional vector elements 82C of an additional vector 82D that are added to vector elements 42 of the input vector 40 during the vector processing operation 34. For example, the additional vector 82D may be a precomputed activation vector that is used to control machine learning model outputs during an inferencing phase via activation addition.

Figure 7B:
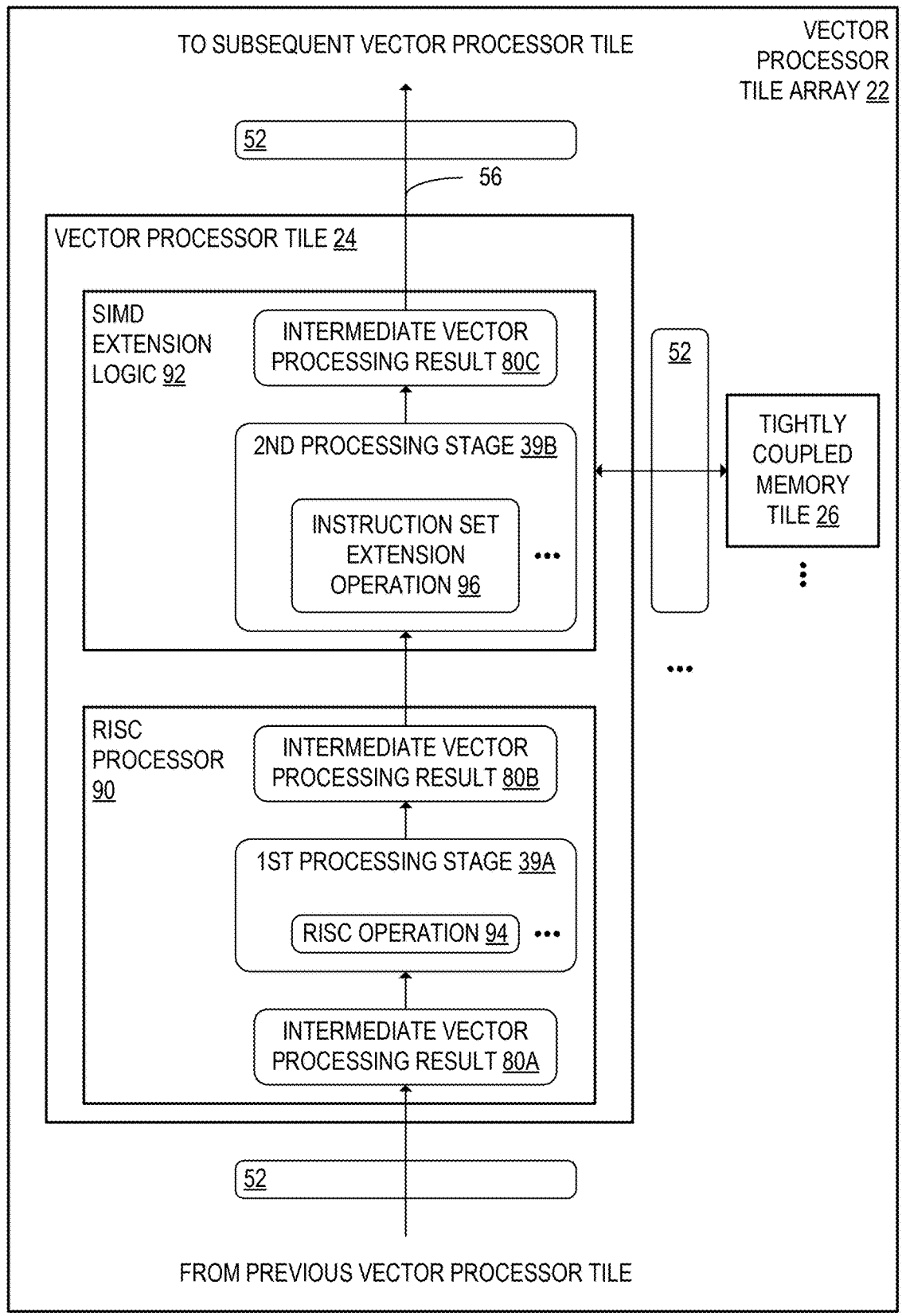
FIG. 7B schematically shows the vector processor tile array in an example in which the vector processor tiles are configured to perform a multi-stage vector processing operation at a reduced instruction set computer (RISC) processor and single-instruction-multiple-data extension logic, according to the example of FIG. 2.

FIG. 7B schematically shows the vector processor tile array 22 in another example in which the vector processor tiles 24 are configured to perform a multi-stage vector processing operation 34. In the example of FIG. 7B, as in the example of FIG. 7A, the vector processor tiles 24 are each configured to compute respective intermediate vector processing results 80 and transmit the intermediate vector processing results 80 to other vector processor tiles 24 via the token transfer ring 56. The vector processor tile 24 of FIG. 7B is configured to receive an intermediate vector processing result 80A from the previous vector processor tile 24.

The example vector processor tile 24 shown in FIG. 7B includes a reduced instruction set computer (RISC) processor 90 and single-instruction-multiple-data (SIMD) extension logic 92. The RISC processor 90 is configured to implement a plurality of RISC operations 94, whereas the SIMD extension logic 92 is configured to implement a plurality of instruction set extension operations 96. Thus, the vector processor tile 24 is configured to perform a wider variety of operations than are supported at the RISC processor 90.

At the first processing stage 39A, the example vector processor tile 24 of FIG. 7B is configured to perform one or more of the RISC operations 94 on the intermediate vector processing result 80A to compute an intermediate vector processing result 80B. At the SIMD extension logic 92, the vector processor tile 24 is further configured to perform one or more of the instruction set extension operations 96 on the intermediate vector processing result 80B during the second processing stage 39B to compute an intermediate vector processing result 80C. The intermediate vector processing result 80C is transmitted to the subsequent vector processor tile 24 over the token transfer ring 56. In some examples, computation of the intermediate vector processing results 80B and/or 80C may further include storage at and retrieval from the tightly coupled memory tile 26, as discussed above with reference to FIG. 7A.

Figure 8A:
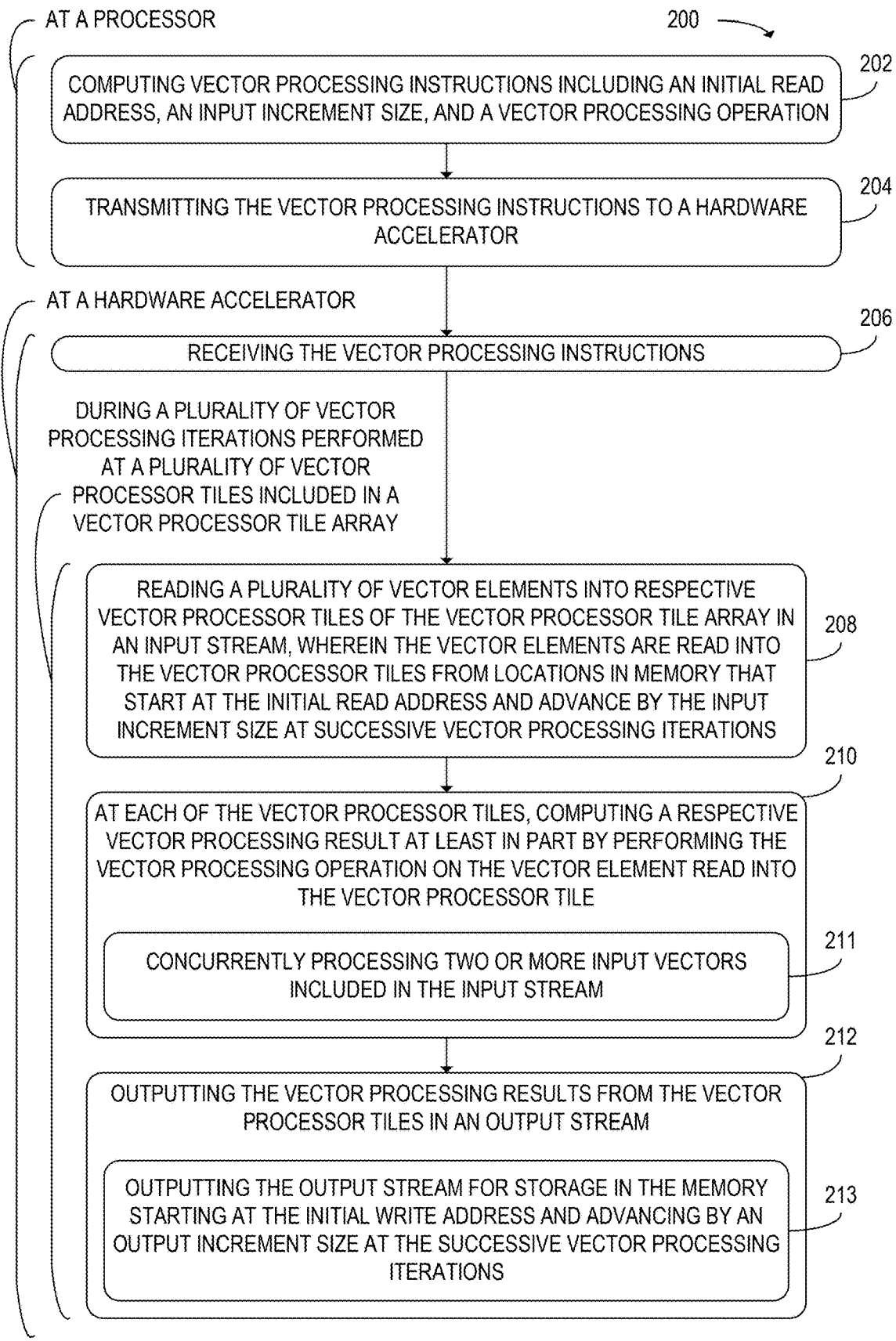
FIG. 8A shows a flowchart of a method for use with a computing system that includes a processor, memory, and a hardware accelerator, according to the example of FIG. 1.

FIG. 8A shows a flowchart of a method 200 for use with a computing system that includes a processor, memory, and a hardware accelerator. The hardware accelerator includes a vector processor that is configured to perform operations on vector-valued inputs more efficiently than a generic processor.

Steps 202 and 204 of the method 200 are performed at the processor included in the computing system. At step 202, the method 200 includes computing vector processing instructions including an initial read address, an input increment size, and a vector processing operation. Other quantities such as an input increment count, an output increment size, and an output increment count may also be included in the vector processing instructions in some examples. In some examples, the vector processing operation is a SoftMax operation or a layernorm operation. At step 204, the method 200 further includes transmitting the vector processing instructions to the hardware accelerator.

Steps 206, 208, 210, 211, 212, and 213 are performed at the hardware accelerator. At step 206, the method 200 further includes receiving the vector processing instructions. For example, the vector processing instructions may be received at a vector processor boot loader that computes address reset instructions based at least in part on the vector processing instructions. The vector processing instructions may also be received at a FIFO interface included in the hardware accelerator.

Steps 208, 210, 211, 212, and 213 are performed during a plurality of vector processing iterations. The vector processing iterations are performed at a plurality of vector processor tiles included within the hardware accelerator in a vector processor tile array. At step 208, the method 200 further includes reading a plurality of vector elements into respective vector processor tiles of the vector processor tile array in an input stream. The vector elements are read into the vector processor tiles from locations in memory that start at the initial read address specified in the vector processing instructions. At successive vector processing iterations, the locations in the memory advance by the input increment size. Reading the vector elements into the vector processor tiles may include transmitting fetch requests from the hardware accelerator to one or more memory devices included in the memory of the computing system. For example, the fetch requests may be transmitted at respective vector processing iterations.

At step 210, the method 200 further includes computing a respective vector processing result at each of the vector processor tiles. The vector processing results are each computed at least in part by performing the vector processing operation on the vector element read into the vector processor tile.

In some examples, step 210 includes step 211. At step 211, the method 200 may further include concurrently processing two or more input vectors included in the input stream. The vector processor tile array may receive the two or more input vectors during overlapping periods of time. For example, the hardware accelerator may begin receiving a second input vector before it has finished receiving a first input vector.

At step 212, the method 200 further includes outputting the vector processing results from the vector processor tiles in an output stream. In examples in which the vector processor tile array concurrently processes two or more input vectors, the hardware accelerator may output the corresponding vector processing results associated with the two or more input vectors during overlapping periods of time. The vector processing results may be output to the memory, the processor, or some other computing component.

Step 213 may be performed when outputting the vector processing results in examples in which the vector processing instructions further include an initial write address. At step 213, step 212 may further include outputting the output stream for storage in the memory starting at the initial write address and advancing by an output increment size at the successive vector processing iterations. The hardware accelerator may output the output stream without relying on the processor for memory access management, thereby decreasing the latency of performing the vector processing operation.

Figure 8B:
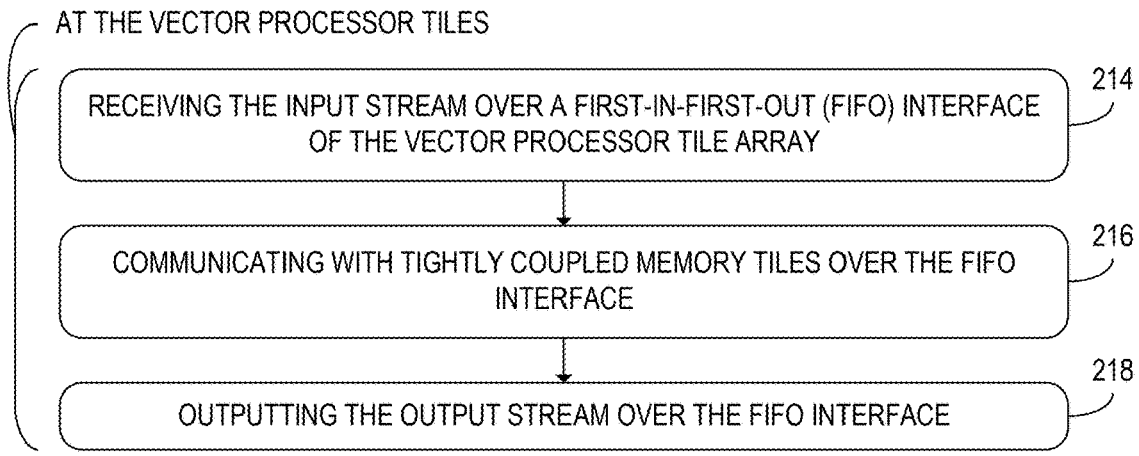
FIGS. 8B-8D show additional steps of the method of FIG. 8A that may be performed in some examples.

FIG. 8B shows additional steps of the method 200 that may be performed at the vector processor tiles in some examples. At step 214, the method 200 may further include receiving the input stream over a FIFO interface of the vector processor tile array. Receiving the input stream over the FIFO interface may have lower latency than loading inputs into an input buffer prior to processing, as is done at conventional vector processors.

Step 216 may be performed in examples in which the vector processor tile array further includes a plurality of tightly coupled memory tiles respectively associated with the vector processor tiles. At step 216, the method 200 may further include communicating with the tightly coupled memory tiles over the FIFO interface. For example, intermediate vector processing results or additional inputs of the vector processing operation may be stored at the tightly coupled memory tiles and retrieved by the vector processor tiles.

At step 218, the method 200 may further include outputting the output stream over the FIFO interface. Similarly to receiving the input stream over the FIFO interface, outputting the output stream over the FIFO interface may reduce latency associated with memory transfer.

Figure 8C:
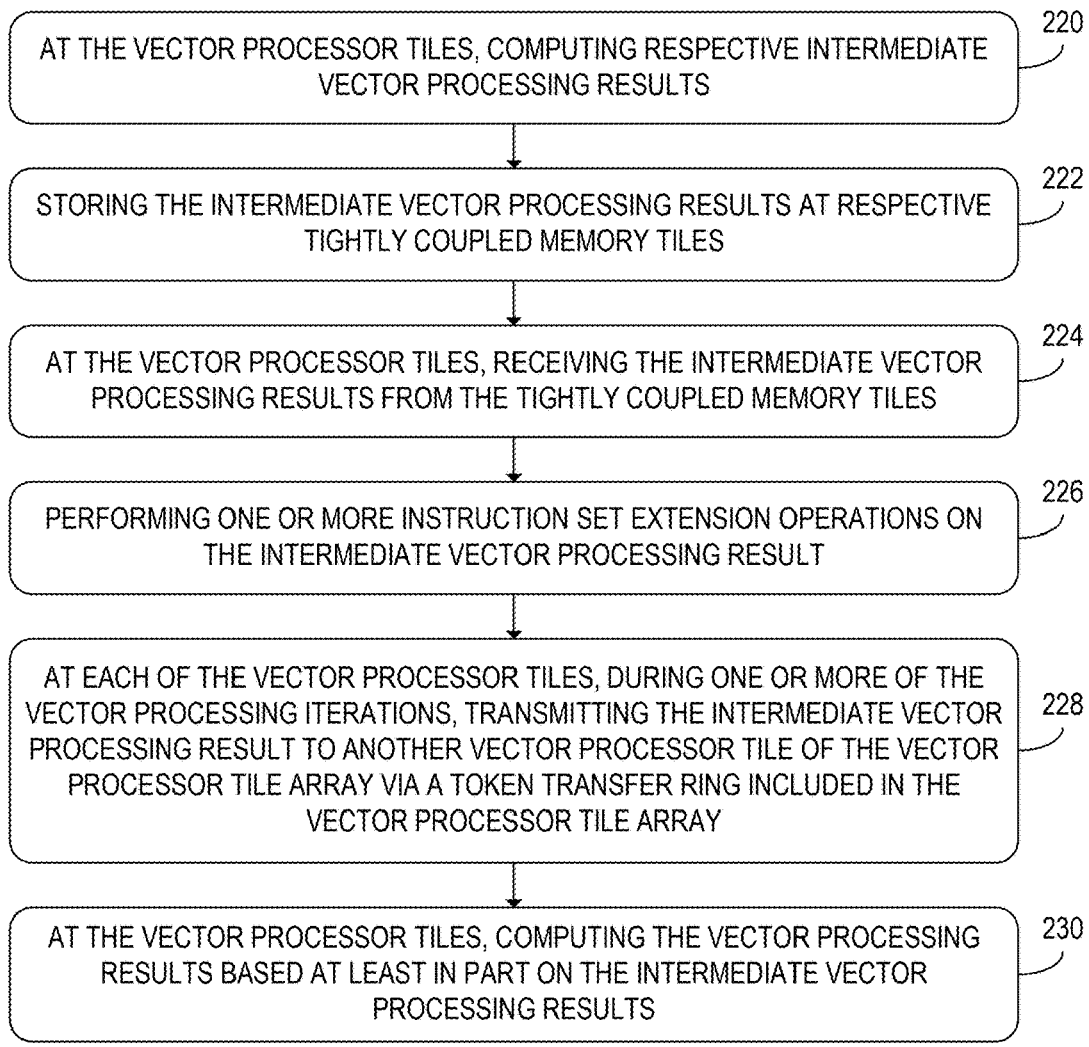

FIG. 8C shows additional steps of the method 200 that may be performed in examples in which the vector processing operation is a multi-stage operation. At step 220, the method 200 may further include, at the vector processor tiles, computing respective intermediate vector processing results. For example, each of the intermediate vector processing results may be computed at a RISC processor that is included in the corresponding vector processor tile and is configured to perform one or more RISC operations.

At step 222, the method 200 may further include storing the intermediate vector processing results at respective tightly coupled memory tiles. The intermediate vector processing results may be transferred to the tightly coupled memory tiles via DMA over the FIFO interface. At step 224, at the vector processor tiles, the method 200 may further include receiving the intermediate vector processing results from the tightly coupled memory tiles. The intermediate vector processing results may be received over the FIFO interface.

In examples in which the vector processor tiles include respective RISC processors, the vector processor tiles may further include SIMD logic that implements instruction set extension operations not supported by the RISC processors. In such examples, at step 226, the method 200 may further include performing one or more instruction set extension operations on the intermediate vector processing result. The one or more instruction set extension operations may alternatively be performed on respective vector elements prior to or instead of performing RISC operations at the RISC processor.

In some examples, the vector processor tile array further includes a token transfer ring. In such examples, the method 200 may further include step 228, which may be performed at each of the vector processor tiles during one or more of the vector processing iterations. At step 228, the method 200 may further include transmitting the intermediate vector processing result to another vector processor tile of the vector processor tile array via the token transfer ring. The token transfer ring may utilize the FIFO interface to transmit the intermediate vector processing results between the vector processor tiles. At step 230, the method 200 may further include computing the vector processing results at the vector processor tiles based at least in part on the intermediate vector processing results. The vector processing results may thereby be computed over multiple processing stages in a vector processing operation that utilizes multiple different vector processor tiles.

Figure 8D:
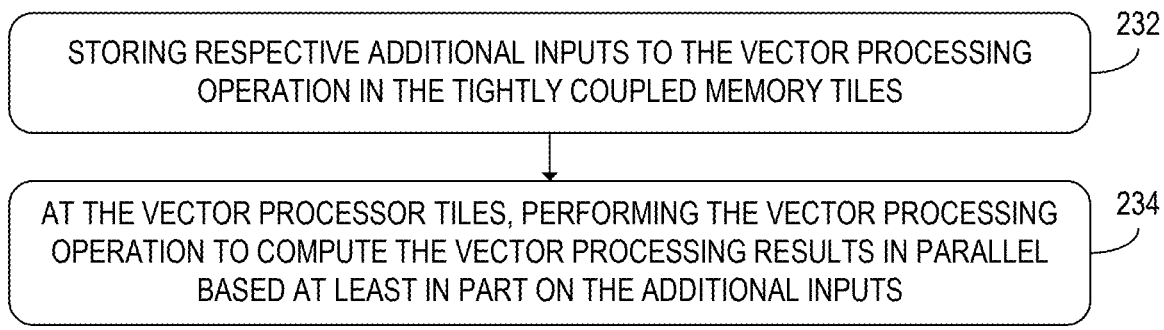

FIG. 8D shows additional steps of the method 200 that may be performed in some examples in which the vector processor tile array includes a plurality of tightly coupled memory tiles. At step 232, the method 200 may further include storing respective additional inputs to the vector processing operation in the tightly coupled memory tiles. At step 234, the method 200 may further include, at the vector processor tiles, performing the vector processing operation to compute the vector processing results in parallel based at least in part on the additional inputs. For example, the additional inputs may include a multiplicand that is used in an elementwise multiplication operation. As another example, the tightly coupled memory tiles may store elements of another vector that are added to the elements of the input vector.

Example pseudocode for a SoftMax operation 34A is provided below. The SoftMax operation 34A is defined according to the following equation:

$$\text{Softmax}(v_i) = \frac{e^{v_i}}{\sum_{j=1}^{n} e^{v_j}}$$

In the above equation, $v_i$ is an ith vector element.

The example pseudocode is provided as follows:

```
N = number of tiles
I = number of inputs per tile
Init memory write to address 0, increment 1
**Part one: numerator + partial denominator:
for i in I:
   input stream → exp → accumulator
   save exp → memory
**accumulator will now hold part of the denominator according to inputs
to specific tile
**Part two: complete accumulation of denominator:
for n in N−1:
   pass sum to neighbor
   **passing the temporary sums accumulated in part 1
   pull from neighbor → accumulator
**accumulator will now hold total denominator in each tile
**Part three: fetch all numerators and divide by denominator
Init memory prefetch to number of inputs
Set read address 0, increment 1
for i in I:
   memory → scalar div → output stream
**Done
```

As shown in the above pseudocode, the vector processor tiles compute the numerators in parallel using the respective vector elements they receive in the input stream. The vector processor tiles compute the denominator by accumulating a partial sum that is passed along the token transfer ring. To compute the SoftMax elements that are included in the vector processing results, the vector processor tiles divide their respective numerators by the accumulated denominator after the computation of the denominator is complete. The structure of the vector processor tile array accordingly facilitates computation of vector processing results that include both parallel and sequential processing steps.

Using the devices and methods discussed above, a hardware accelerator that includes a vector processor tile array is configured to perform vector processing operations on vector-valued inputs more efficiently than the vector processors included in conventional hardware accelerators. By streaming the inputs and outputs of the vector processor tile array in a manner that allows overlapping of the vector processing operations performed on different input vectors, the idle time of the vector processor tile array may be significantly reduced. For example, while conventional vector processors are typically idle approximately half the time during machine learning model training and inferencing, the devices and methods discussed above may allow for almost full utilization of the vector processor tile array. The devices and methods discussed above may therefore allow for significant speedups in machine learning tasks.

In addition to the latency reduction achieved by using input and output streams, the devices and methods discussed above may further reduce the latency of vector processing operations by reducing the amount of communication performed between the hardware accelerator and the processor. The memory access patterns discussed above, in which the hardware accelerator iteratively retrieves vector elements from memory without requiring additional instructions from the processor following the initial set of vector processing instructions, may accelerate vector operations by reducing the amount of time spent on communication between the processor and the hardware accelerator. Such memory access patterns may also avoid having to perform additional processing at the processor to generate multiple sets of vector processing instructions.

The methods and processes described herein are tied to a computing system of one or more computing devices. In particular, such methods and processes can be implemented as a computer-application program or service, an application-programming interface (API), a library, and/or other computer-program product.

Figure 9:
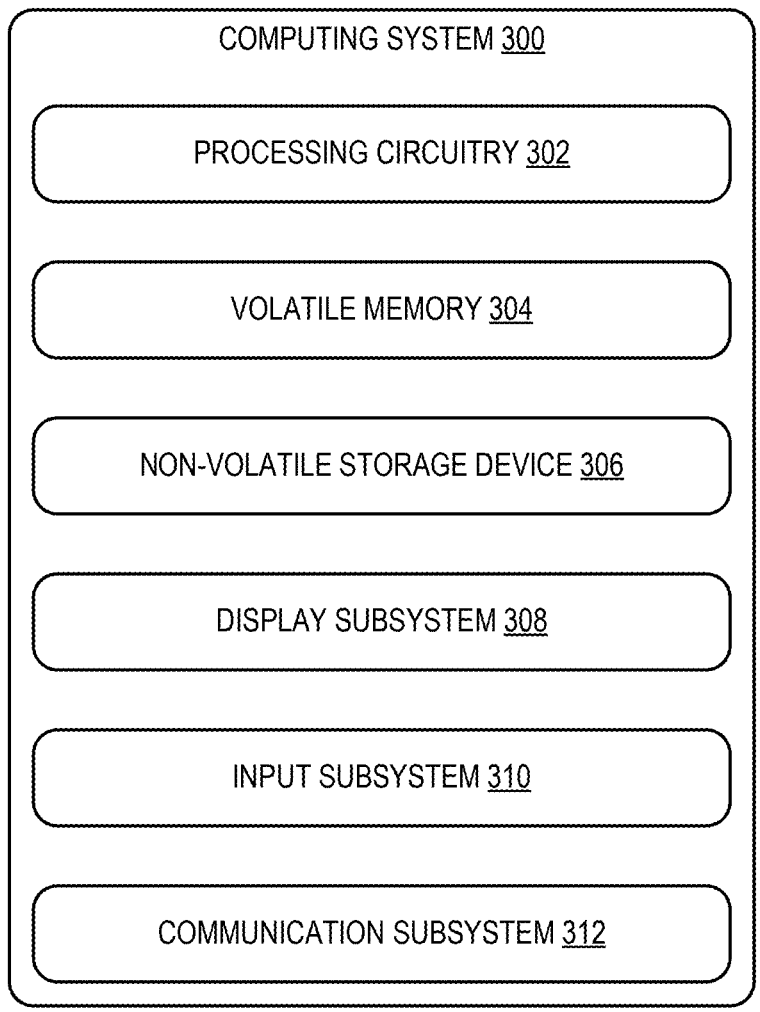
FIG. 9 shows a schematic view of an example computing environment in which the computing system of FIG. 1 may be instantiated.

FIG. 9 schematically shows a non-limiting embodiment of a computing system 300 that can enact one or more of the methods and processes described above. Computing system 300 is shown in simplified form. Computing system 300 may embody the computing system 10 described above and illustrated in FIG. 1. Components of computing system 300 may be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 300 includes processing circuitry 302, volatile memory 304, and a non-volatile storage device 306. Computing system 300 may optionally include a display subsystem 308, input subsystem 310, communication subsystem 312, and/or other components not shown in FIG. 9.

Processing circuitry 302 typically includes one or more logic processors, which are physical devices configured to execute instructions. For example, the logic processors may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 302 may be single-core or multi-core, and the instructions executed thereon may be configured for sequential, parallel, and/or distributed processing. Individual components of the processing circuitry 302 optionally may be distributed among two or more separate devices, which may be remotely located and/or configured for coordinated processing. For example, aspects of the computing system 300 disclosed herein may be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 302.

Non-volatile storage device 306 includes one or more physical devices configured to hold instructions executable by the processing circuitry to implement the methods and processes described herein. When such methods and processes are implemented, the state of non-volatile storage device 306 may be transformed—e.g., to hold different data.

Non-volatile storage device 306 may include physical devices that are removable and/or built in. Non-volatile storage device 306 may include optical memory, semiconductor memory, and/or magnetic memory, or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by processing circuitry 302 to temporarily store information during processing of software instructions. It will be appreciated that volatile memory 304 typically does not continue to store instructions when power is cut to the volatile memory 304.

Aspects of processing circuitry 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via processing circuitry 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device 306, and thus transform the state of the non-volatile storage device 306, the state of display subsystem 308 may likewise be transformed to visually represent changes in the underlying data. Display subsystem 308 may include one or more display devices utilizing virtually any type of technology. Such display devices may be combined with processing circuitry 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, camera, or microphone.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem 312 may be configured for communication via a wired or wireless local- or wide-area network, broadband cellular network, etc. In some embodiments, the communication subsystem 312 may allow computing system 300 to send and/or receive messages to and/or from other devices via a network such as the Internet.

The following paragraphs discuss several aspects of the present disclosure. According to one aspect of the present disclosure, a computing system is provided, including a hardware accelerator configured to receive vector processing instructions from a processor. The vector processing instructions include an initial read address, an input increment size, and a vector processing operation. During a plurality of vector processing iterations performed at a plurality of vector processor tiles included in a vector processor tile array, the hardware accelerator is further configured to read a plurality of vector elements into respective vector processor tiles of the vector processor tile array in an input stream. The vector elements are read into the vector processor tiles from locations in memory that start at the initial read address and advance by the input increment size at successive vector processing iterations. At each of the vector processor tiles, the hardware accelerator is further configured to compute a respective vector processing result at least in part by performing the vector processing operation on the vector element read into the vector processor tile. The hardware accelerator is further configured to output the vector processing results from the vector processor tiles in an output stream. The above features may have the technical effect of performing a vector processing operation in a manner that reduces latency by reducing the amount of communication performed between the hardware accelerator and the processor. The streaming of inputs and outputs may further increase processing speed by allowing vector processing operations performed on different inputs to overlap in time.

According to this aspect, the vector processor tiles may be further configured to receive the input stream and output the output stream over a first-in-first-out (FIFO) interface of the vector processor tile array. The above features may have the technical effect of reducing latency associated with memory storage and retrieval of inputs and outputs.

According to this aspect, the vector processor tile array may further include a plurality of tightly coupled memory tiles respectively associated with the vector processor tiles. The vector processor tiles may each be configured to communicate with the tightly coupled memory tiles over the FIFO interface. The above features may have the technical effect of allowing the vector processor tiles to store and retrieve locally processed data in parallel.

According to this aspect, the vector processor tiles may be further configured to compute respective intermediate vector processing results. The vector processor tiles may be further configured to store the intermediate vector processing results at respective tightly coupled memory tiles. The vector processor tiles may be further configured to receive the intermediate vector processing results from the tightly coupled memory tiles and compute the vector processing results based at least in part on the intermediate vector processing results. The above features may have the technical effect of performing multi-stage vector processing operations at the vector processor tiles in parallel.

According to this aspect, the hardware accelerator may be further configured to store respective additional inputs to the vector processing operation in the tightly coupled memory tiles. At the vector processor tiles, the hardware accelerator may be further configured to perform the vector processing operation to compute the vector processing results in parallel based at least in part on the additional inputs. The above features may have the technical effect of parallelizing steps of a vector processing operation that take multiple inputs.

According to this aspect, at one or more of the vector processing iterations, the vector processor tiles may each be further configured to compute a respective intermediate vector processing result. Via a token transfer ring included in the vector processor tile array, the vector processor tiles may each be further configured to transmit the intermediate vector processing result to another vector processor tile of the vector processor tile array. The above features may have the technical effect of performing a vector processing operation that utilizes intermediate vector processing results computed at multiple different tiles.

According to this aspect, the vector processor tiles may be configured to transmit the intermediate vector processing results along the token transfer ring via a first-in-first-out (FIFO) interface included in the hardware accelerator. The above features may have the technical effect of efficiently transmitting the intermediate vector processing results between the vector processor tiles.

According to this aspect, the vector processor tiles may each include a reduced instruction set computer (RISC) processor. The vector processor tiles may each further include single-instruction-multiple-data (SIMD) extension logic configured to implement a plurality of instruction set extension operations. At the SIMD extension logic, the vector processor tile may be further configured to perform one or more of the instruction set extension operations on the intermediate vector processing result prior to transmitting the intermediate vector processing result along the token transfer ring. The above features may have the technical effect of enabling a wider variety of operation types at the vector processor tiles.

According to this aspect, the hardware accelerator may be configured to concurrently process two or more input vectors included in the input stream. The above feature may have the technical effect of increasing the efficiency of processing a plurality of input vectors by reducing the idle time of the vector processor tiles.

According to this aspect, the vector processing operation is a SoftMax operation or a layernorm operation. The above features may have the technical effect of efficiently performing an operation that frequently occurs in machine learning model execution.

According to this aspect, the vector processing instructions may further include an initial write address. The hardware accelerator may be further configured to output the output stream for storage in the memory starting at the initial write address and advancing by an output increment size at the successive vector processing iterations. The above features may have the technical effect of outputting the vector processing results in a manner that has low communication overhead.

According to another aspect of the present disclosure, a method for use with a computing system is provided. The method includes, at a processor, computing vector processing instructions including an initial read address, an input increment size, and a vector processing operation. The method further includes transmitting the vector processing instructions to a hardware accelerator. The method further includes, at the hardware accelerator, receiving the vector processing instructions. During a plurality of vector processing iterations performed at a plurality of vector processor tiles included in a vector processor tile array, the method further includes reading a plurality of vector elements into respective vector processor tiles of the vector processor tile array in an input stream. The vector elements are read into the vector processor tiles from locations in memory that start at the initial read address and advance by the input increment size at successive vector processing iterations. At each of the vector processor tiles, the method further includes computing a respective vector processing result at least in part by performing the vector processing operation on the vector element read into the vector processor tile. The method further includes outputting the vector processing results from the vector processor tiles in an output stream. The above features may have the technical effect of performing a vector processing operation in a manner that reduces latency by reducing the amount of communication performed between the hardware accelerator and the processor. The streaming of inputs and outputs may further increase processing speed by allowing vector processing operations performed on different inputs to overlap in time.

According to this aspect, the method may further include, at the vector processor tiles, receiving the input stream and outputting the output stream over a first-in-first-out (FIFO) interface of the vector processor tile array. The above features may have the technical effect of reducing latency associated with memory storage and retrieval of inputs and outputs.

According to this aspect, the vector processor tile array may further include a plurality of tightly coupled memory tiles respectively associated with the vector processor tiles. The method may further include, at the vector processor tiles, communicating with the tightly coupled memory tiles over the FIFO interface. The above features may have the technical effect of allowing the vector processor tiles to store and retrieve locally processed data in parallel.

According to this aspect, the method may further include, at the vector processor tiles, computing respective intermediate vector processing results. The method may further include storing the intermediate vector processing results at respective tightly coupled memory tiles. The method may further include receiving the intermediate vector processing results from the tightly coupled memory tiles and computing the vector processing results based at least in part on the intermediate vector processing results. The above features may have the technical effect of performing multi-stage vector processing operations at the vector processor tiles in parallel.

According to this aspect, the method may further include, at each of the vector processor tiles, during one or more of the vector processing iterations, transmitting the intermediate vector processing result to another vector processor tile of the vector processor tile array via a token transfer ring included in the vector processor tile array. The above features may have the technical effect of performing a vector processing operation that utilizes intermediate vector processing results computed at multiple different tiles.

According to this aspect, the method may further include, at the hardware accelerator, concurrently processing two or more input vectors included in the input stream.

According to this aspect, the vector processing operation may be a SoftMax operation or a layernorm operation. The above features may have the technical effect of efficiently performing an operation that frequently occurs in machine learning model execution.

According to this aspect, the vector processing instructions may further include an initial write address. The method may further include, at the hardware accelerator, outputting the output stream for storage in the memory starting at the initial write address and advancing by an output increment size at the successive vector processing iterations. The above features may have the technical effect of outputting the vector processing results in a manner that has low communication overhead.

According to another aspect of the present disclosure, a computing system is provided, including a hardware accelerator. The computing system further includes a processor configured to compute vector processing instructions including an initial read address and an input increment size. The processor is further configured to transmit the vector processing instructions to the hardware accelerator. The hardware accelerator is configured to receive the vector processing instructions. During a plurality of vector processing iterations performed at a plurality of vector processor tiles included in a vector processor tile array, the hardware accelerator is further configured to read a plurality of vector elements into respective vector processor tiles of the vector processor tile array in an input stream. The vector elements are read into the vector processor tiles from locations in memory that start at the initial read address and advance by the input increment size at successive vector processing iterations. At each of the vector processor tiles, the hardware accelerator is further configured to compute a respective vector processing result at least in part by performing a vector processing operation on the vector element read into the vector processor tile. Performing the vector processing operation includes computing respective intermediate vector processing results at the vector processor tiles and transmitting the intermediate vector processing results among the plurality of vector processor tiles via a token transfer ring included in the vector processor tile array. Performing the vector processing operation further includes computing the vector processing results based at least in part on the intermediate vector processing results. The hardware accelerator is further configured to output the vector processing results from the vector processor tiles in an output stream. The above features may have the technical effect of performing a vector processing operation in a manner that reduces latency by reducing the amount of communication performed between the hardware accelerator and the processor. The streaming of inputs and outputs may further increase processing speed by allowing vector processing operations performed on different inputs to overlap in time.

"And/or" as used herein is defined as the inclusive or $\vee$, as specified by the following truth table:

| A | B | A $\vee$ B |
|---|---|---|
| True | True | True |
| True | False | True |

-continued

| A | B | A $\vee$ B |
|---|---|---|
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
   a hardware accelerator configured to:
      receive vector processing instructions from a processor, wherein the vector processing instructions include an initial read address, an input increment size, and a vector processing operation; and
      during a plurality of vector processing iterations performed at a plurality of vector processor tiles included in a vector processor tile array:
         read a plurality of vector elements into respective vector processor tiles of the vector processor tile array in an input stream, wherein the vector elements are read into the vector processor tiles from locations in memory that start at the initial read address and advance by the input increment size at successive vector processing iterations;
         at each of the vector processor tiles, compute a respective vector processing result at least in part by performing the vector processing operation on the vector element read into the vector processor tile, wherein computing the respective vector processing result at each of the vector processor tiles includes:
            at least in part at a reduced instruction set computer (RISC) processor included in the vector processor tile, computing a respective intermediate vector processing result at each of the vector processor tiles; and
            at single-instruction-multiple-data (SIMD) extension logic configured to implement a plurality of instruction set extension operations not supported by the RISC processor, performing one or more of the instruction set extension operations on the intermediate vector processing result; and
         output the vector processing results from the vector processor tiles in an output stream.

2. The computing system of claim 1, wherein the vector processor tiles are further configured to receive the input stream and output the output stream over a first-in-first-out (FIFO) interface of the vector processor tile array.

3. The computing system of claim 2, wherein:
the vector processor tile array further includes a plurality of tightly coupled memory tiles respectively associated with the vector processor tiles; and
the vector processor tiles are each configured to communicate with the tightly coupled memory tiles over the FIFO interface.

4. The computing system of claim 1, wherein the vector processor tiles are further configured to:
store the intermediate vector processing results at respective tightly coupled memory tiles;
receive the intermediate vector processing results from the tightly coupled memory tiles; and
compute the vector processing results based at least in part on the intermediate vector processing results.

5. The computing system of claim 3, wherein the hardware accelerator is further configured to:
store respective additional inputs to the vector processing operation in the tightly coupled memory tiles; and
at the vector processor tiles, perform the vector processing operation to compute the vector processing results in parallel based at least in part on the additional inputs.

6. The computing system of claim 1, wherein, at one or more of the vector processing iterations, the vector processor tiles are each further configured to:
via a token transfer ring included in the vector processor tile array, transmit the intermediate vector processing result to another vector processor tile of the vector processor tile array.

7. The computing system of claim 6, wherein the vector processor tiles are configured to transmit the intermediate vector processing results along the token transfer ring via a first-in-first-out (FIFO) interface included in the hardware accelerator.

8. The computing system of claim 6, wherein:
at the SIMD extension logic, the vector processor tile is further configured to perform the one or more of the instruction set extension operations on the intermediate vector processing result prior to transmitting the intermediate vector processing result along the token transfer ring.

9. The computing system of claim 1, wherein the hardware accelerator is configured to concurrently process two or more input vectors included in the input stream.

10. The computing system of claim 1, wherein the vector processing operation is a SoftMax operation or a layernorm operation.

11. The computing system of claim 1, wherein:
the vector processing instructions further include an initial write address; and
the hardware accelerator is further configured to output the output stream for storage in the memory starting at the initial write address and advancing by an output increment size at the successive vector processing iterations.

12. A method for use with a computing system, the method comprising:
at a processor:
computing vector processing instructions including an initial read address, an input increment size, and a vector processing operation; and
transmitting the vector processing instructions to a hardware accelerator; and
at the hardware accelerator:
receiving the vector processing instructions; and
during a plurality of vector processing iterations performed at a plurality of vector processor tiles included in a vector processor tile array:
reading a plurality of vector elements into respective vector processor tiles of the vector processor tile array in an input stream, wherein the vector elements are read into the vector processor tiles from locations in memory that start at the initial read address and advance by the input increment size at successive vector processing iterations;
at each of the vector processor tiles, computing a respective vector processing result at least in part by performing the vector processing operation on the vector element read into the vector processor tile, wherein computing the respective vector processing result at each of the vector processor tiles includes:
at least in part at a reduced instruction set computer (RISC) processor included in the vector processor tile, computing a respective intermediate vector processing result at each of the vector processor tiles; and
at single-instruction-multiple-data (SIMD) extension logic configured to implement a plurality of instruction set extension operations not supported by the RISC processor, performing one or more of the instruction set extension operations on the intermediate vector processing result; and
outputting the vector processing results from the vector processor tiles in an output stream.

13. The method of claim 12, further comprising, at the vector processor tiles, receiving the input stream and outputting the output stream over a first-in-first-out (FIFO) interface of the vector processor tile array.

14. The method of claim 13, wherein:
the vector processor tile array further includes a plurality of tightly coupled memory tiles respectively associated with the vector processor tiles; and
the method further comprises, at the vector processor tiles, communicating with the tightly coupled memory tiles over the FIFO interface.

15. The method of claim 12, further comprising, at the vector processor tiles:
storing the intermediate vector processing results at respective tightly coupled memory tiles;
receiving the intermediate vector processing results from the tightly coupled memory tiles; and
computing the vector processing results based at least in part on the intermediate vector processing results.

16. The method of claim 15, further comprising, at each of the vector processor tiles, during one or more of the vector processing iterations, transmitting the intermediate vector processing result to another vector processor tile of the vector processor tile array via a token transfer ring included in the vector processor tile array.

17. The method of claim 12, further comprising, at the hardware accelerator, concurrently processing two or more input vectors included in the input stream.

18. The method of claim 12, wherein the vector processing operation is a SoftMax operation or a layernorm operation.

19. The method of claim 12, wherein:
the vector processing instructions further include an initial write address; and
the method further comprises, at the hardware accelerator, outputting the output stream for storage in the memory starting at the initial write address and advancing by an output increment size at the successive vector processing iterations.

20. A computing system comprising:
a hardware accelerator; and
a processor configured to:
compute vector processing instructions including an initial read address and an input increment size; and
transmit the vector processing instructions to the hardware accelerator,
wherein the hardware accelerator is configured to:
receive the vector processing instructions; and
during a plurality of vector processing iterations performed at a plurality of vector processor tiles included in a vector processor tile array:
read a plurality of vector elements into respective vector processor tiles of the vector processor tile array in an input stream, wherein the vector elements are read into the vector processor tiles from locations in memory that start at the initial read address and advance by the input increment size at successive vector processing iterations;
at each of the vector processor tiles, compute a respective vector processing result at least in part by performing a vector processing operation on the vector element read into the vector processor tile, wherein performing the vector processing operation includes:
at least in part at a reduced instruction set computer (RISC) processor included in the vector processor tile, computing respective intermediate vector processing results at the vector processor tiles;
transmitting the intermediate vector processing results among the plurality of vector processor tiles via a token transfer ring included in the vector processor tile array; and
at single-instruction-multiple-data (SIMD) extension logic configured to implement a plurality of instruction set extension operations not supported by the RISC processor, computing the vector processing results based at least in part on the intermediate vector processing results by performing one or more of the instruction set extension operations on the intermediate vector processing results; and
output the vector processing results from the vector processor tiles in an output stream.

* * * * *